(12) United States Patent
von Klopp et al.

(10) Patent No.: US 7,099,939 B2
(45) Date of Patent: Aug. 29, 2006

(54) HTTP TRANSACTION MONITOR WITH SEQUENCE REPLAY CAPACITY

(75) Inventors: Ana H. von Klopp, San Francisco, CA (US); George C. Finklang, San Francisco, CA (US)

(73) Assignee: Sun Microsystems Inc., Santa Clara, CA (US)

( * ) Notice: Subject to any disclaimer, the term of this patent is extended or adjusted under 35 U.S.C. 154(b) by 874 days.

(21) Appl. No.: 09/874,893

(22) Filed: Jun. 5, 2001

(65) Prior Publication Data

US 2002/0062369 A1    May 23, 2002

Related U.S. Application Data

(60) Provisional application No. 60/237,823, filed on Oct. 3, 2000.

(51) Int. Cl.
*G06F 15/173* (2006.01)

(52) U.S. Cl. .................. 709/224; 709/203; 709/217; 709/218; 709/219; 709/225

(58) Field of Classification Search ................ 709/224, 709/203, 200, 201, 217, 218, 219, 227; 714/38
See application file for complete search history.

(56) References Cited

U.S. PATENT DOCUMENTS

| | | | | |
|---|---|---|---|---|
| 5,852,717 A | * | 12/1998 | Bhide et al. ................. 709/203 |
| 6,035,324 A | * | 3/2000 | Chang et al. ................. 709/203 |
| 6,052,730 A | * | 4/2000 | Felciano et al. ............. 709/225 |
| 6,219,803 B1 | * | 4/2001 | Casella et al. ................. 714/38 |
| 6,317,786 B1 | * | 11/2001 | Yamane et al. .............. 709/224 |

\* cited by examiner

*Primary Examiner*—Yves Dalencourt
(74) *Attorney, Agent, or Firm*—Osha Liang LLP

(57) ABSTRACT

A method for monitoring data flow in a web application hosted on a server includes obtaining a list of HTTP requests processed on the server while interacting with the web application, selecting a number of HTTP requests from the list, and sending a request to the server to re-process the selected number of HTTP requests in a predetermined sequence.

31 Claims, 6 Drawing Sheets

HTTP TRANSACTION MONITOR WITH SEQUENCE REPLAY CAPACITY

CROSS-REFERENCE TO RELATED APPLICATIONS

This application claims priority from U.S. Provisional Application Ser. No. 60/237,823, filed Oct. 3, 2000. This application is related to original U.S. patent application Ser. No. 09/730,686, entitled "HTTP Transaction Monitor," filed Dec. 6, 2000, and original U.S. patent application Ser. No. 09/789,238, entitled "HTTP Transaction Monitor with Replay Capacity," filed Feb. 20, 2001.

COPYRIGHT STATEMENT

A portion of the disclosure of this patent document contains material which is subject to copyright protection. The copyright owner has no objection to the facsimile reproduction by anyone of the patent document or the patent disclosure, as it appears in the Patent and Trademark Office file or records, but otherwise reserves all copyright rights whatsoever.

TERMINOLOGY

The following definitions of some terms are helpful in understanding the background discussion and the detailed description of the invention.

API (Application Programming Interface)—An interface for application programs and utilities to access the internal services provided by the software that comprises the API.

Applet—A Java™ program embedded in a HTML document and executed in a Java™—enabled browser.

ASP™ (Active Server Pages™)—A scripting environment developed by Microsoft Corporation. ASP™ allows HTML, scripts, and ActiveX components to be combined to create dynamic web pages.

Bean—A JavaBeans™ component.

CGI (Common Gateway Interface)—A standard for running external programs from an HTTP server.

CGI Script—A small program written in a script language such as Perl that can be invoked through a request to the web server.

Class—A user-defined data type that defines a collection of objects that share the same characteristics. An object is one instance of the class.

Client—A program, often including a user interface, which initiates contact with another program (a server) for the purposes of exchanging data. The server runs in a different process and/or on a different host from the client.

Cookie—A packet of information sent by an HTTP server to a web browser and then sent back by the browser each time the browser accesses the same resource on the server or any other set of resources that is declared by the cookie. Cookies are used to maintain state between HTTP transactions. Cookies are not visible to the browser user.

DHTML (Dynamic HTML)—An extension of HTML. DHTML gives greater control over the layout of page elements and the ability to have web pages which change and interact with the user without having to communicate with the server.

Directory—A simulated file folder on disk.

E-commerce (Electronic commerce)—Typically implies purchasing products via the Web. It also covers electronic data interchange, in which one company's computer queries and transmits purchase orders to another company's computer.

Execution Server—An HTTP server that is used by an IDE for the purposes of assisting with the processes of developing dynamic web components. The IDE uses the execution server to run JSPs and servlets, or dynamic page generation components in general.

GUI (Graphical User Interface)—A graphics-based interface that incorporates, for example, icons, menus, and text entry areas and allows for non-linear user interaction (as opposed to character-based interfaces where the user enters data by answering questions in a set order).

Hook—Programming instructions that provide breakpoints for future expansion. Hooks can be used to call some outside routine or function or may be places where additional processing is added.

HTML (HyperText Markup Language)—A hypertext document format used on the World Wide Web.

HTTP (Hypertext Transfer Protocol)—An application-level protocol for distributed, collaborative, hypermedia information systems.

HTTP Request—A message sent by a client to a server using HTTP. The first line of the request contains the method to be applied to the resource requested, the identifier of the resource, and the protocol version in use. The first line is followed by HTTP headers, lines which provide information about the client, which are optionally followed by a data stream.

HTTP Response—A message sent to a client after the HTTP server receives and interprets a request message from the client. The first line of the response includes the protocol version used by the server and a success or error code. The first line is followed by HTTP headers with information about the server and about the (optional) body content that follows the headers as a data stream.

HTTP Server—A server process which processes HTTP requests.

HTTP Session—Part of the Java Servlet™ API. Allows the HTTP server to maintain state between different HTTP requests. The HTTP server knows which session to associate with the request because the browser sends the session ID as part of the request. This can either be done with a cookie or by adding a parameter to the request URL.

IDE (Integrated Development Environment)—An application that facilitates the process of writing software. An IDE typically includes a syntax-based editor, graphical tools for program entry, and integrated support for compiling, executing, and debugging the program.

IDE Session—The instance of an IDE (and all its internal states) that is created when the user starts up and uses the IDE. The session ends when the user exits the IDE instance.

Internal HTTP Server—Sometimes referred to as internal server. An HTTP server that runs in the same process of an application for the purposes of providing services to it.

J2EE™—Java 2 Platform, Enterprise Edition.

JavaBeans™—A component software architecture that runs in the Java™ environment, initially developed by Sun Microsystems, Inc. JavaBeans™ allows developers to create reusable components that can be assembled together using a visual application builder tool.

JSP™ (JavaServer Pages™)—A specification to extend the JavaServlet™ API to generate dynamic web pages on a web server. It includes a set of tags in XML format for creating dynamic content in web pages. In order to use JSP™ on a web server, the web server needs a JSP™ engine and a servlet engine. The JSP™ engine is responsible for generating a servlet from the JSP™ page and maintaining a name convention such that the servlet is invoked when the JSP™ page is processed. JSP™ was developed by Sun Microsystems, Inc.

JSP™ Page—A text-based document that uses fixed template data and JSP™ elements and describes how to process a request to create a response. The template data consists of JSP™ tags embedded in static content which is typically HTML.

LRI (Local Resource Identifier)—The location of a resource relative to the hierarchical structure of the server, e.g., a path relative to the server's document root if the resource is a file.

Plug-in—An auxiliary program that works with a major software package to enhance its capability.

Process—An executing program with its own internal data states that are not accessible to other processes.

Web Resource—A network data object or service that can be identified by a URI.

Server—An application program that accepts connections in order to service requests by sending back responses.

Servlet—A Java™ program that runs exclusively in a servlet engine which is an extension to a web server.

URL (Uniform Resource Locator)—A compact string representative of resources available via the network. A URL has the form <protocol>://<server name><LRI><?optional parameters>.

Virtual Machine—A self-contained operating environment that behaves as if it is a separate computer. A Java™ virtual machine is a Java™ interpreter that converts Java byte code into machine language one at a time and then executes it.

Web Browser—A client application that requests resources from a web server, usually for the purpose of displaying them. Examples of browsers are Microsoft® Internet Explorer and Netscape Navigator.

XML (eXtensible Markup Language)—A mark-up language that provides a format for describing structured data.

BACKGROUND OF INVENTION

1. Field of the Invention

The invention relates generally to web application development systems. More specifically, the invention relates to a mechanism for monitoring data flow in a web application, particularly during testing and debugging of the web application.

2. Background Art

A web application is a web site where users can access the information they need and change the state of application logic on a server through a set of web pages. Development of web applications is usually centered around tools and technologies. A web application centered around the Java™ technology may include the following: JSP™ pages and Java™ servlets that handle HTTP requests and generate dynamic content, server-side beans that encapsulate application behavior and state, static HTML files, DHTML files, image files, sound files, and libraries with additional Java™ components, such as client-side Java™ applets and any Java™ class files used by the other Java™ components. The J2EE™ specification describes a standard for how to organize such files into web modules, including describing how they are accessed. The web modules could be developed in an IDE, such as sold under the trade name Forte™ for Java™ by Sun Microsystems, Inc., Palo Alto, Calif.

The process of test-running and debugging web applications that provide dynamic responses to different user inputs involves testing each component that generates pages with every possible type of user input. This includes user input that is technically incorrect (e.g., entering "&&%" into a field where the expected input is a U.S. zip code). To understand how the process works, consider an e-commerce application that contains a set of pages (A–G) that allows a user to move through a checkout process. The sequence of events for the checkout process is outlined in Table 1 below. A common architecture for this type of web application would be to have each of the pages (A–G) correspond to an individual JSP™ page. Further, because the order in which the pages can be traversed needs to be controlled, all requests for these JSPs™ are handled by a servlet, which allows them to be displayed in appropriate circumstances.

TABLE 1

Sequence of events for checkout process

| Page | Event |
|---|---|
| A | The user views the contents of the shopping cart for the purposes of accepting the selected items. Page A is displayed only if the user has selected some items. |
| B | The user enters their credit card information and home address. |
| C | The information from page B is displayed, giving the user the option to go back to page B to correct the information or move forward to page D. |
| D | The user enters the shipping address. |
| E | The shipping address from page D is displayed, giving the user the option to go back to page D to correct the shipping address or move forward to page F. |
| F | All the information entered by the user (i.e., items purchased, credit card information, home address, and shipping address) is displayed. Page F gives the user the option to proceed with or cancel the transaction. |
| G | A thank-you note is displayed if the user completes the transaction. |

Now, suppose that the developer has identified a problem with how the input from page D (i.e., the shipping address) is processed. In order to reproduce the problem, the developer has to achieve a certain state with respect to the web application. This would involve first performing the HTTP transactions required to put something in the shopping cart, or else the controller servlet will not allow the pages to be accessed at all. Then the developer has to move through page A, fill in credit card information and home address on page B, move through page C, and fill in shipping address on D in order to reproduce the problem. HTML forms need to be filled in order to allow the resource that needs debugging to be accessed.

In the scenario described above, it is clearly desirable for the developer to be able to place the web application in the desired state without having to enter data through HTML forms in order to put something in the shopping cart and reenter the same data into the different pages. The mechanism described in U.S. patent application Ser. No. 09/789, 238, supra, allows a user to collect information about HTTP transactions and replay the HTTP transactions at a later time. If the HTTP transactions during shopping (i.e., while selecting items) and the checkout process are recorded, they can be replayed at a later time. To use this mechanism for debugging the web application described above, the developer would have to find the desired transactions to replay, and then replay each one individually. This process has to be repeated for each debugging cycle.

SUMMARY OF INVENTION

In one aspect, the invention relates to a method for monitoring data flow in a web application hosted on a server which comprises obtaining a list of HTTP requests processed by the server while interacting with the web application, selecting a number of the HTTP requests from the list, and sending a request to the server to re-process the selected number of HTTP requests in a predetermined sequence.

In another aspect, the invention relates to a method for monitoring data flow in a web application hosted on a server which comprises saving HTTP transactions executed on the server while interacting with the web application, selecting a number of the saved HTTP transaction, and sending a request to the server to re-execute the selected number of the saved HTTP transactions in a predetermined sequence.

In another aspect, the invention relates to a mechanism for monitoring data flow in a web application hosted on a server which comprises a directory for storing HTTP transactions executed on the server while interacting with the web application and a display through which a request can be sent to the server to re-execute a selected number of the HTTP transactions in the directory in a predetermined sequence.

In another aspect, the invention relates to a system for testing and debugging a web application which comprises a server hosting the web application, a directory for storing HTTP transactions executed on the server while interacting with the web application, and a client through which a request can be sent to the server re-execute a selected number of the HTTP transactions in the directory in a predetermined sequence.

Other aspects and advantages of the invention will be apparent from the following description and the appended claims.

DETAILED DESCRIPTION

Embodiments of the invention provide a tool for replaying HTTP transactions in a predetermined sequence during testing and debugging of a web application. The tool allows a user to save HTTP transactions, extract a set of the saved HTTP transactions, and replay all of the HTTP transactions in the set in a predetermined sequence with a single user gesture. The tool is particularly useful when debugging a web application that includes wizard-like behavior, where the user enters data through a number of web pages that must be accessed in a particular order. A very common example of this wizard-like behavior is the checkout process included in most e-commerce applications. As discussed in the background, to reproduce a problem encountered during the checkout process, the web application has to be placed in a certain state. For example, the web application may be set up in such a way that the user is not allowed to start the checkout process unless one or more products have been placed in the shopping cart. Using the tool of the invention, the user can select a set of HTTP transactions that need to be executed in order to place the web application in the desired state. The user can then replay the set of HTTP transactions in a predetermined sequence to place the web application in the desired state.

In the following detailed description of the invention, numerous specific details are set forth in order to provide a more thorough understanding of the invention. For example, a web application which contains JSPs™ and servlets is used in illustrating the principles of the invention. However, it will be apparent to one of ordinary skill in the art that the invention may be practiced without these specific details. For example, the invention is applicable to web applications containing other type of dynamic page generation components such as ASPs™ and CGI scripts. In other instances, well-known features have not been described in detail to avoid obscuring the invention. Also, for convenience, the following description is outlined into five principal sections, including Architecture Overview, Storing and Managing HTTP Transaction Data, HTTP Transaction Monitor GUI, HTTP Transaction Monitor Server-Side Functionality, and Operation.

Architecture Overview

Figure 1:
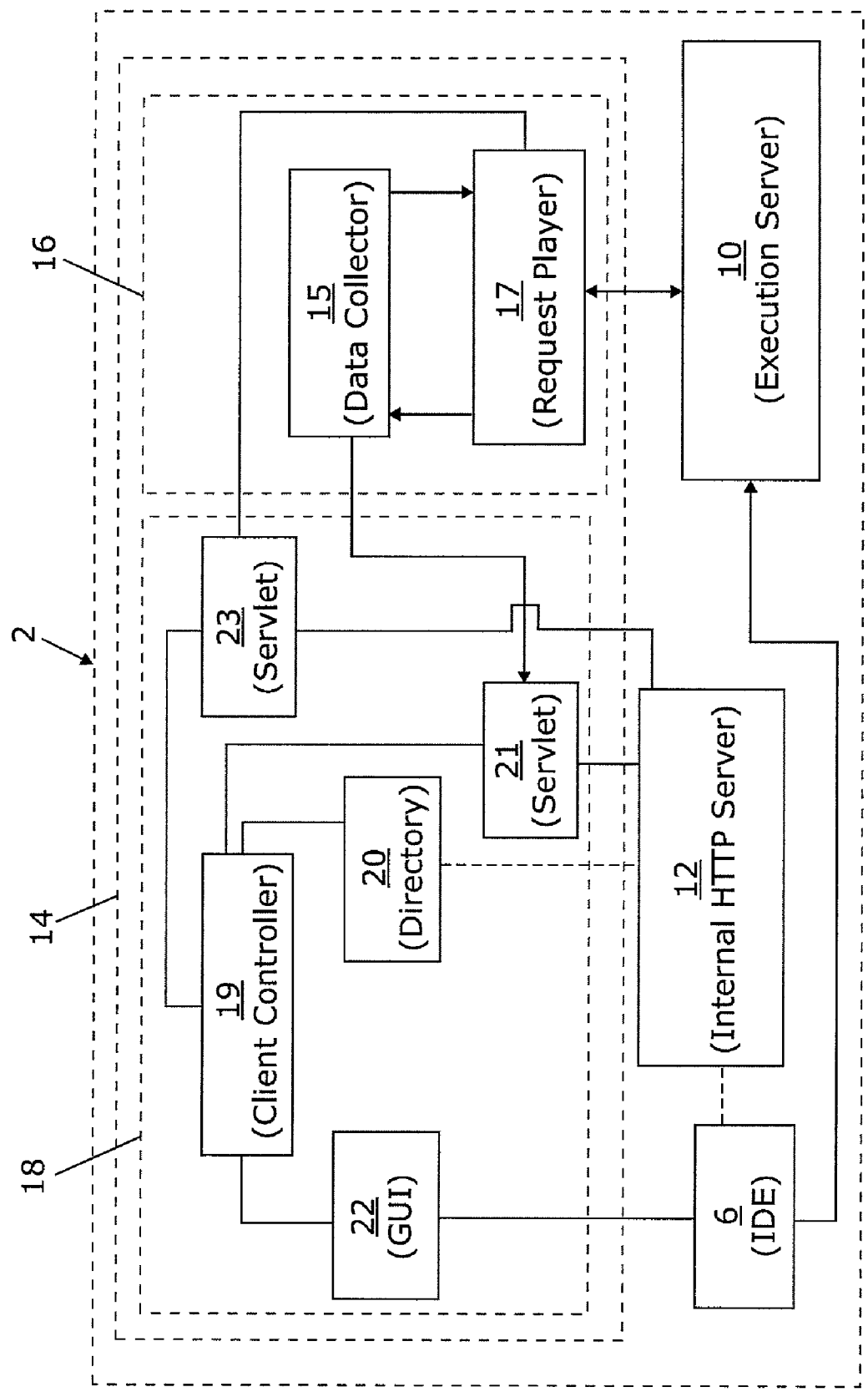
FIG. 1 is a block diagram of a testing/debugging system incorporating an HTTP transaction monitor according to one embodiment of the invention.

FIG. 1 shows a block diagram of a testing/debugging system 2 which includes an embodiment of the invention. The testing/debugging system 2 includes an IDE 6, which may be used to design, compile, execute, test, and debug components of a web application. In one embodiment, the IDE 6 is a Java™ application which consists of bytecodes that are interpreted by a Java™ Virtual Machine (not shown). However, a portion or all of the IDE 6 may be written in another programming language, e.g., C++. When the IDE 6 is started, a GUI (not shown) is displayed through which a developer can develop and/or view the components of the web application. Further, the IDE 6 can execute the web application components in an HTTP server that is running in a separate process. This HTTP server will be referred to as the execution server 10. The execution server 10 may be started, for example, when a user selects a file representation of a JSP™ page (not shown) from the IDE 6. The execution server 10 may be on the same host machine as the IDE 6 or may be on a different host machine.

In accordance with one embodiment of the invention, an HTTP transaction monitor 14 includes a server-side component 16 and a client-side component 18. The server-side component 16 collects data about HTTP transactions resulting from HTTP requests processed on the execution server 10. The client-side component 18 manages and displays the collected data. The HTTP transactions can either be initiated by the IDE 6 or through an external HTTP client, e.g., a browser, pointed to the host and port of the execution server 10. The server-side component 16 includes a data collector 15 that is responsible for collecting data before and after the execution server 10 processes the HTTP requests. In one implementation, the data collector 15 process runs on the execution server 10 and relies on hooks in the execution server 10 to intercept HTTP requests in order to collect data about them. In an alternate embodiment, the data collector 15 may use hooks in a web container (not shown) to intercept HTTP requests. A web container, such as a servlet engine, provides runtime support for dynamic components of the web application. The web container may run inside or outside of the execution server 10 process.

The server-side component 16 also includes a request player 17 running on the execution server 10. The request player 17 detects a special type of HTTP request, called a "replay request." The replay request indicates that a prior HTTP transaction should be re-executed. In one embodiment, the replay request includes data that allows the request player 17 to retrieve the corresponding transaction record from the client-side component 18. The transaction record contains the request data, i.e., the IP address of the client from which the HTTP request originated, the HTTP method, the request URI, the protocol version, any query string and parameters, and all the HTTP headers, needed to recreate the prior HTTP request. The request player 17 rewrites the replay request with the data retrieved from the client-side component 18 and transfers the modified replay request to the data collector 15 for data collection. After data collection, the replay request is processed by the execution server 10. In one implementation, the request player 17 relies on hooks in the execution server 10 or hooks in a web container (e.g., a servlet engine) to intercept requests coming into the execution server 10 in order to determine whether the requests are replay requests.

The client-side component 18 includes a GUI (or display) 22 for displaying data about the HTTP requests for which the server-side component 16 has collected data. The GUI 22 also allows the user to select an HTTP transaction and send a request to the execution server 10 to re-execute the HTTP transaction. A component of the GUI 22 may also send replay requests programmatically (i.e., through function invocation) to the execution server 10. The request data associated with each replay request may correspond exactly to the original request data associated with the prior HTTP transaction to be re-executed or may be a modification of the original request data. In one implementation, the GUI 22 is accessible from the IDE 6, and the IDE 6 includes a mechanism through which the data collector 15 can notify the client-side component 18 of HTTP requests processed by the execution server 10. This mechanism can be an HTTP server 12 which is built into the IDE 6 and configurable from the IDE 6. If the HTTP transaction monitor 14 is run as a standalone application, then the client-side component 18 would be responsible for maintaining the mechanism through which it is notified when the execution server 10 processes a new HTTP request.

For each HTTP transaction that the execution server 10 processes, the data collector 15 collects the five categories of data shown in Table 1. In addition to the categories of data shown in Table 1, the data collector 15 generates the information required to list the transaction in the GUI 22. In one embodiment, this information includes the ID of the transaction, the HTTP method, the LRI of the request, and timestamp of the transaction. Additional data may be included to generate more detailed list entries.

TABLE 1

Categories of Data Collected by Server-Side Component

| Category | List of Data Collected |
| --- | --- |
| Request | The IP address of the host from which the request was sent, the HTTP method, the LRI, path information (if appropriate), the query string, the protocol version, the referrer (if appropriate), the value of any incoming parameters, and the exit status of the HTTP response. All HTTP headers associated with request. |

TABLE 1-continued

Categories of Data Collected by Server-Side Component

| Category | List of Data Collected |
| --- | --- |
| Cookies | List of incoming and outgoing cookies. For incoming cookies, the name and value is provided. For outgoing cookies, the name, value, domain, time to live, path and whether the cookie requires secure protocol. |
| Session | Whether the session exists before and after the transaction. Which attributes were set and what their values are before and after the transaction. The session's properties: its ID, when it was created, its maximum inactive interval, and when it was last accessed. |
| Servlet/ Server Properties | Name of the servlet as configured, its class name, its package name, the description given by the developer, and the relative path to the servlet. The servlet's initialization parameters, if there are any. The absolute path to the J2EE ™ context. The servlet engine's properties (Java ™ Development Kit and platform). |
| Client | The version of the HTTP protocol, the client's IP address, any other information provided through the HTTP headers such as the nature of the client, e.g., the type and version of the browser, the user's language preference, and what formats and character sets the browser can deal with. |

Storing and Managing HTTP Transaction Data

The client-side component 18 includes a mechanism for receiving notification of new HTTP transactions, which are subsequently listed on the GUI 22. In one embodiment, this functionality is handled by a servlet 21 that runs on the internal HTTP server 12 and is called whenever the server-side component 16 records a new transaction. In one implementation, notification of a newly recorded transaction is sent to the servlet 21 in the form of an HTTP POST request with a query string appended to the URL and the transaction data (in a structured format such as XML) as the posted data. The HTTP POST request identifies the name of the host on which the IDE 6 is running and the port number of the internal HTTP server 12. The query string has the general format: ID|METHOD|RESOURCE, where <ID> is a string that uniquely identifies the transaction, <METHOD> is the HTTP method of the original request, and <RESOURCE> is the path relative to the server root to the resource that was accessed by the original request. The data from the query string is also part of the XML representation. The query string is simply used to add a new transaction to the list in GUI 22 without requiring the entire transaction record to be processed at notification time. Notification of newly recorded transactions may also be sent programmatically to the servlet 21. To do this, an HTTP POST request is issued to the servlet 21 with a query string such as described above appended to the URL. Then, a file (typically in a structured format such as XML) containing the transaction data is sent to the servlet 21.

In one embodiment the client-side component 18 uses a directory 20 to store transaction files. The client-side component 18 uses normal file operations to access and manipulate the data stored in the directory 20. In one implementation, the directory 20 has three subdirectories: "current," "save," and "replay." When the client-side component 18 is notified that the execution server 10 has processed a new request, the corresponding transaction is stored in a new file called <id>.xml under the directory "current," where <ID> is the unique identifier described above, and xml is the extension required for xml files. The GUI 22 interacts with the directory 20 through a client controller 19 to update its transaction list. When the user elects to save a transaction through the GUI 22, the user invokes a "Save" action on the transaction, which causes the corresponding transaction files to be moved from the "current" directory to the "save" directory. It should be noted that there may be other ways of keeping track of whether the transactions are current or saved. When the user elects to edit and replay a transaction through the GUI 22, a dialog is displayed which allows the user to edit the transaction. The changes are saved in a temporary file (also called <id>.xml) in the "replay" directory. Upon exiting the IDE 6, the files in the "current" directory may be deleted to conserve disk space. Files in the "saved" and "replay" directories remain until they are explicitly deleted by the user.

HTTP Transaction Monitor GUI

Figure 2:
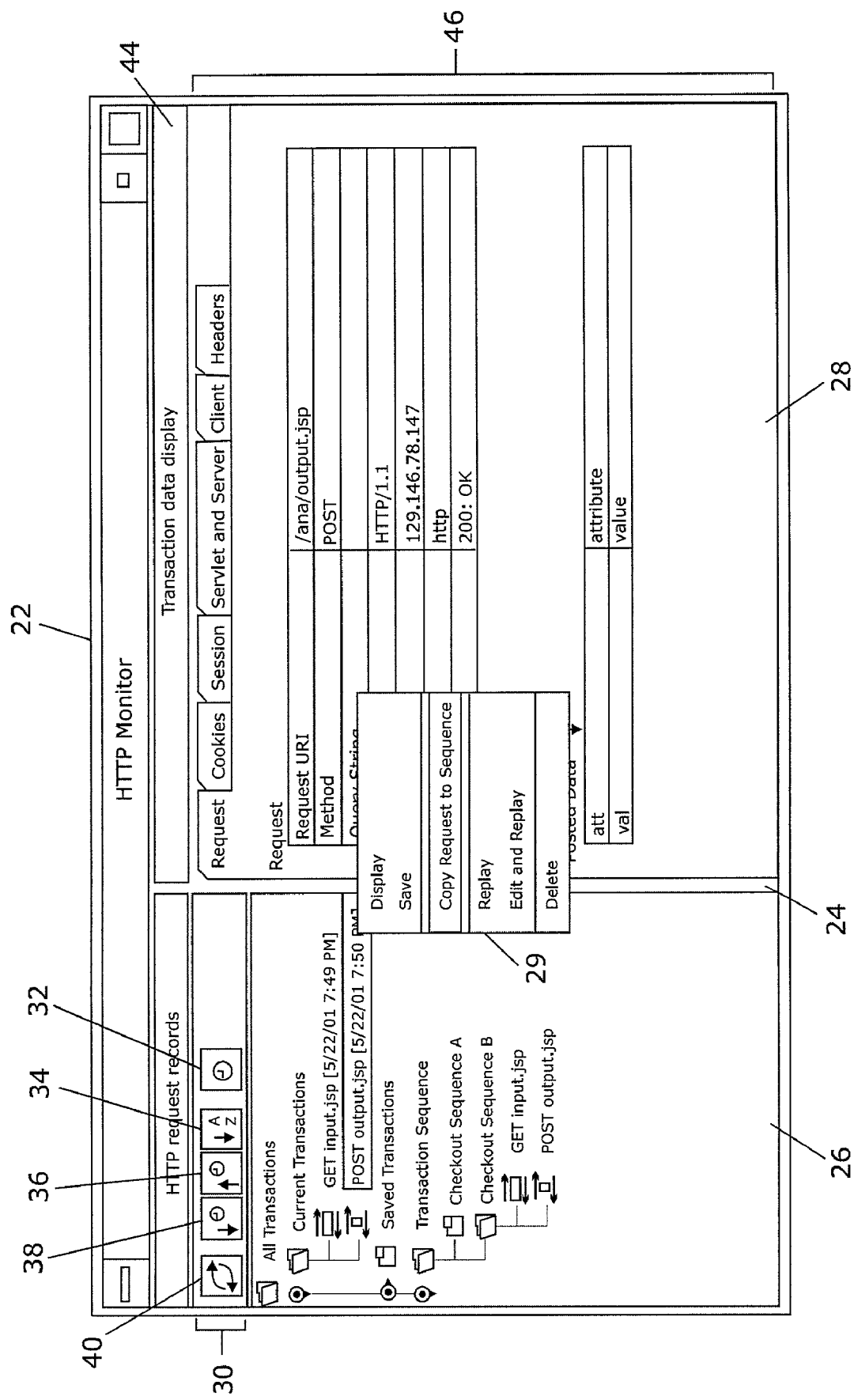
FIG. 2 shows a representation of a display for the HTTP transaction monitor.

The GUI 22 may be a software component that can be called from within the IDE 6 or may be a standalone application. FIG. 2 illustrates a possible representation of the GUI 22. In the figure, the GUI 22 includes a single frame 24 having a left pane 26 and a right pane 28. The GUI 22 displays a list of transactions on the left pane 26 and data for an individual transaction on the right pane 28. A row of buttons 30 above the transaction list on the left pane 26 allows the user to reload all transactions and to modify display parameters. The button 32 reloads all the transactions. The button 34 displays the transactions in alphabetical order, by LRI. The button 36 displays the transactions in temporal order, last transaction last. The button 38 displays the transactions in reverse temporal order, last transaction first. The button 40 toggles whether the time stamp of the transaction is shown or not.

The left pane 26 displays one supercategory node "All Transactions." Under the "All Transactions" node are subcategory nodes "Current Transactions," "Saved Transactions," and "Transaction Sequence." Individual transactions are leaf nodes and reside in either the "Current Transactions" or the "Saved Transactions" node. Entries in the "Current Transactions" node are available during the current IDE session, while entries under the "Saved Transactions" node persist until they are deleted by the user. The entries under the "Current Transactions" and "Saved Transactions" nodes are obtained from the "current" and "save" subdirectories in the directory 20 (shown in FIG. 1). The "Transaction Sequence" node contains folders that are created and named by the user to hold sets of HTTP requests to be replayed together as a sequence. The user adds leaf nodes which correspond to individual HTTP request under these sequence folders. Like the "Saved Transactions" entries, the "Transaction Sequence" entries persist until they are deleted by the user.

"All Transactions," "Current Transactions," and "Save Transactions" nodes have "Delete all transactions," "Delete current transactions," and "Delete saved transactions" actions, respectively. Invoking the "Delete all transactions" action on the "All Transactions" node deletes all transaction entries and removes all nodes from the GUI 22. Invoking "Delete current transactions" action on "Current Transactions" deletes all current transactions and removes the "Current Transactions" node from the GUI 22. Invoking "Delete saved transactions" action on "Saved Transactions" deletes all saved transactions and removes the "Saved Transactions" node from the GUI 22. The "Transaction sequences" node has two actions: "Delete all sequences" and "Create new sequence." The former action deletes all sequence folders and the records they contain and removes the "Transaction sequences" node from the GUI 22. The latter brings up a dialog with a text field where the user enters the name of the new sequence. The dialog provides the user with the option to specify whether the sequence records transactions. If the sequence is set to record transactions, then for each newly executed transaction, a node representing the request associated with the transaction is added to the sequence folder, and a node representing all the transaction data is added to the "Current transactions" folder.

Figure 3A:
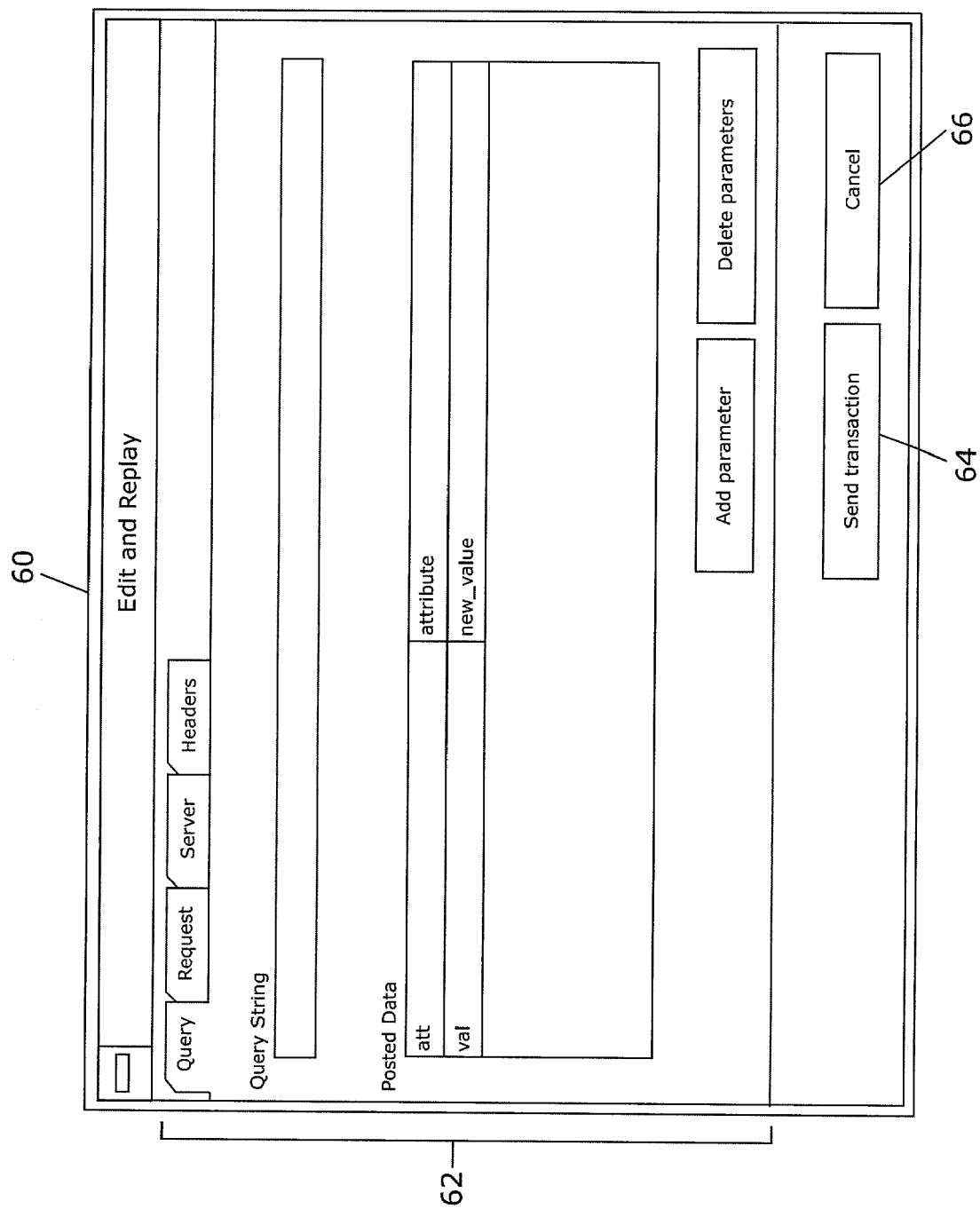
FIG. 3A shows a representation of an HTTP request editor as invoked by the "Edit and Replay" action on current and saved transactions.

Individual transaction nodes in the "Current Transactions" subcategory have six actions: "Display," "Save," "Copy Request to Sequence," "Replay," "Edit and Replay," and "Delete." In the "Saved Transactions" subcategory, the individual transaction nodes have five actions: "Display," "Copy Request to Sequence," "Replay," "Edit and Replay," and "Delete." In one implementation, the list of actions available under each transaction category is displayed in a pop-up menu 29 when the user right-clicks on a transaction. The "Copy Request to Sequence" action brings up a dialog (not shown) where the user can select or create a sequence folder (under the "Transaction Sequence" node) into which to copy an HTTP request. The "Replay" action causes the original HTTP request to be re-processed by the execution server (10 in FIG. 1), as described in U.S. patent application Ser. No. 09/789,238, supra. The "Edit and Replay" action brings up a dialog, such as dialog 60 in FIG. 3A, which allows the user to modify the HTTP request data prior to causing it to be re-processed by the execution server (10 in FIG. 1). As shown in FIG. 3A, the user can use the tabs 62 to change Headers, Request, Query, and Server parameters. After making changes, the user can click the "Send transaction" button 64 to replay the edited transaction or the "Cancel" button 66 to cancel the changes and exit the dialog.

Returning to FIG. 2, the sequence folders under the "Transaction sequence" node are represented by icons which have a badge that indicates whether new transactions have their HTTP requests recorded into the sequence or not. The sequence nodes have the following actions: "Toggle request recording," "Reorder," "Rename," "Replay sequence (step)," "Replay sequence (to end)," and "Delete." "Toggle request recording" determines whether HTTP requests from incoming HTTP transaction records are added to the sequence or not. "Reorder" brings up a dialog (not shown) which shows a list of the HTTP request nodes inside the sequence and allows the user to move individual nodes up or down. "Rename" allows the user to give the sequence folder a different name. "Replay sequence" causes the HTTP requests described by each sequence folder to be replayed one at a time in sequence. With "Replay sequence (step)," the output from each request is shown before moving on to the next request. With "Replay sequence (to end)," only the output of the last request is shown. To execute the sequence, a thread is started which attempts to execute each request in order, waiting for one to succeed before executing the next one. Each individual request will have a timeout, which can be some default number or can be set by the user. If any individual request fails, the output of that request is displayed to the user, and the user is notified of the problem. Otherwise the output of the last request in the sequence is displayed. The "Delete" action causes the sequence folder and the nodes below it to be deleted.

Figure 3B:
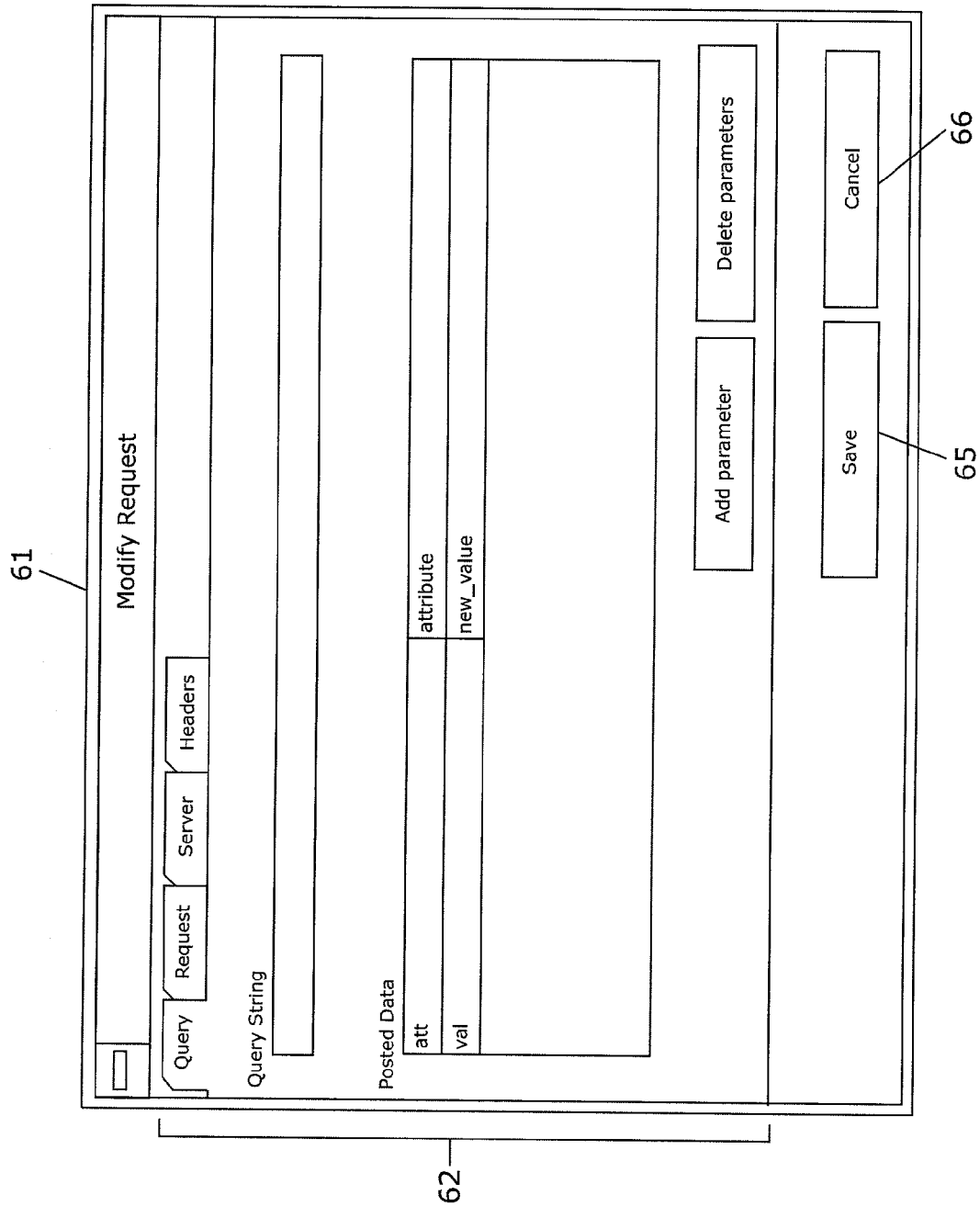
FIG. 3B shows a representation of an HTTP request editor as invoked by the "Modify Request" action on request nodes in a sequence.

Unlike the leaf nodes under "Current Transactions" and "Saved Transactions" which represent an entire transaction, the leaf nodes under the sequence node represent individual HTTP requests. These nodes have the following actions: "Edit," "Rename," "Replay," and "Delete." "Rename" allows the user to change the name of the node. "Replay"

allows the individual HTTP request to be resent. "Delete" deletes the request node. "Edit" brings up a dialog, such as dialog 61 in FIG. 3B. Dialog 61 is similar to the "Edit and Replay" dialog 60 (shown in FIG. 3A), except that the "Send transaction" button (64 in FIG. 3A) has been replaced with a "Save" button 65. After the user edits the HTTP request, the user clicks the "Save" button 65 to save the changes or the "Cancel" button 66 to cancel the changes and exit the dialog.

The right pane includes a display component 44 having six tabs, collectively indicated at 46. For a transaction selected on the left pane 26, the six tabs 46 display the data collected by the server component (16 in FIG. 1) according to the categories shown in Table 1 above. The six tabs 46 have the labels "Request," "Cookies," "Session," "Servlet and Server," "Client," and "Headers," respectively. The "Request" tab displays the request and response parameters for a selected transaction. The HTTP headers associated with the request are displayed separately in the "Headers" tab. The "Cookies" tab displays attributes of incoming and outgoing cookies for a selected transaction. The "Session" tab displays the session status before and after executing the selected transaction. The "Servlet and Server" tab displays the servlet and server properties when the selected transaction was executed. The "Client" tab displays properties of the client making the request for the selected transaction.

Figure 4:
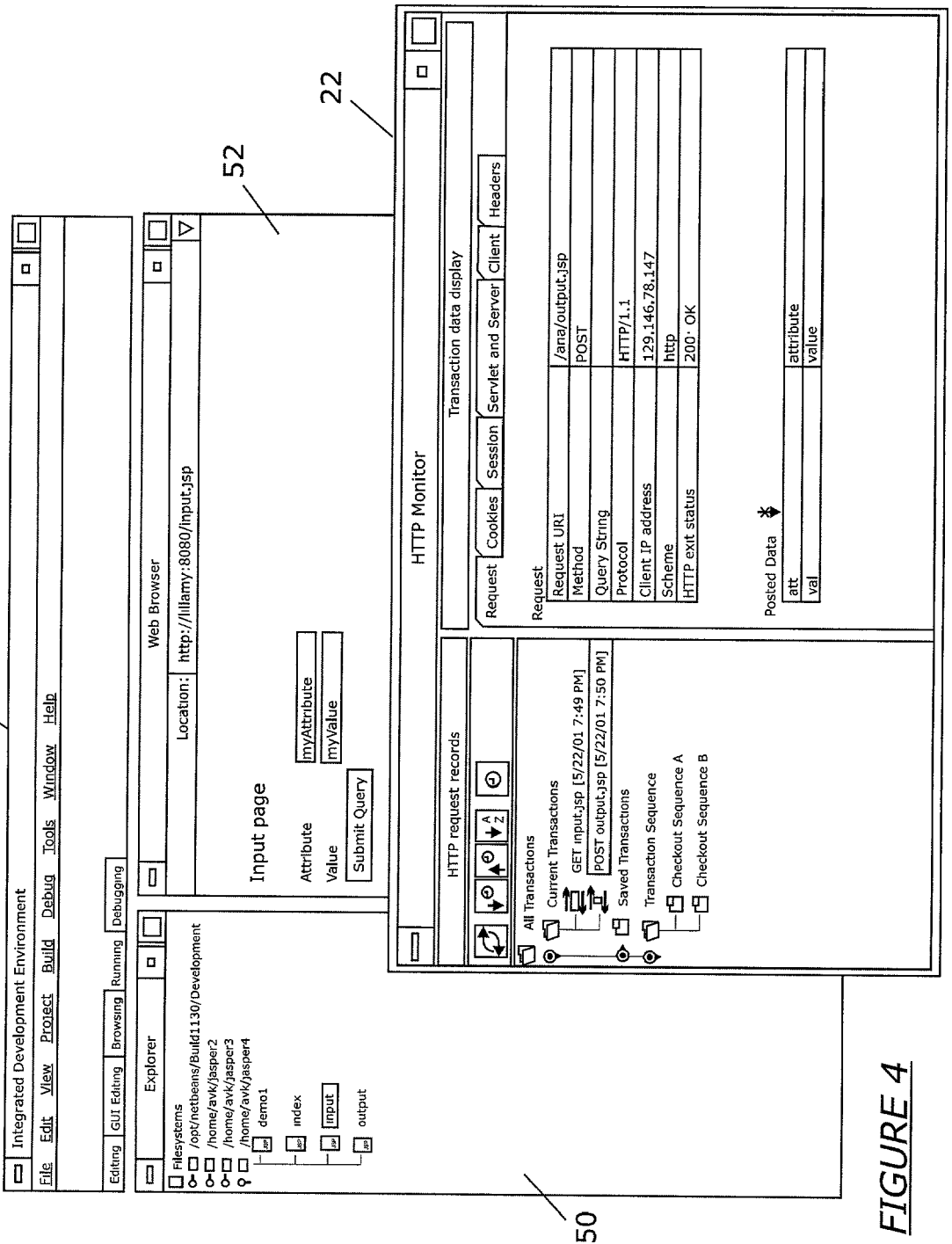
FIG. 4 shows the display for the HTTP transaction monitor invoked from an IDE.

FIG. 4 shows the GUI 22 invoked from within a representation of the IDE 6 (previously shown in FIG. 1). The IDE 6 could be an IDE such as Forte™ for Java™ IDE from Sun Microsystems, Inc. The Forte™ for Java™ IDE includes modules that assist in designing, debugging, and executing JSP™ pages and servlets. However, it should be clear that the invention is not limited to this particular IDE or for that matter to any IDE. The HTTP transaction monitor of the present invention can be used as a standalone tool with an HTTP server. The invention is also not limited to IDEs that support development of JSP™ pages and servlets. In general, the invention can be applied to any development of web applications. In the illustrated embodiment, the user can invoke the GUI 22 by selecting "HTTP Monitor" from the "Debug" or "View" menu of the IDE 6. This displays the GUI 22 during the IDE session or until the GUI 22 is closed by the user. The IDE session is the period during which the user runs one instance of the IDE 6. The IDE session starts when the user brings up the IDE 6 and ends when the user exits the IDE 6.

HTTP Transaction Monitor Server-Side Functionality

Figure 5:
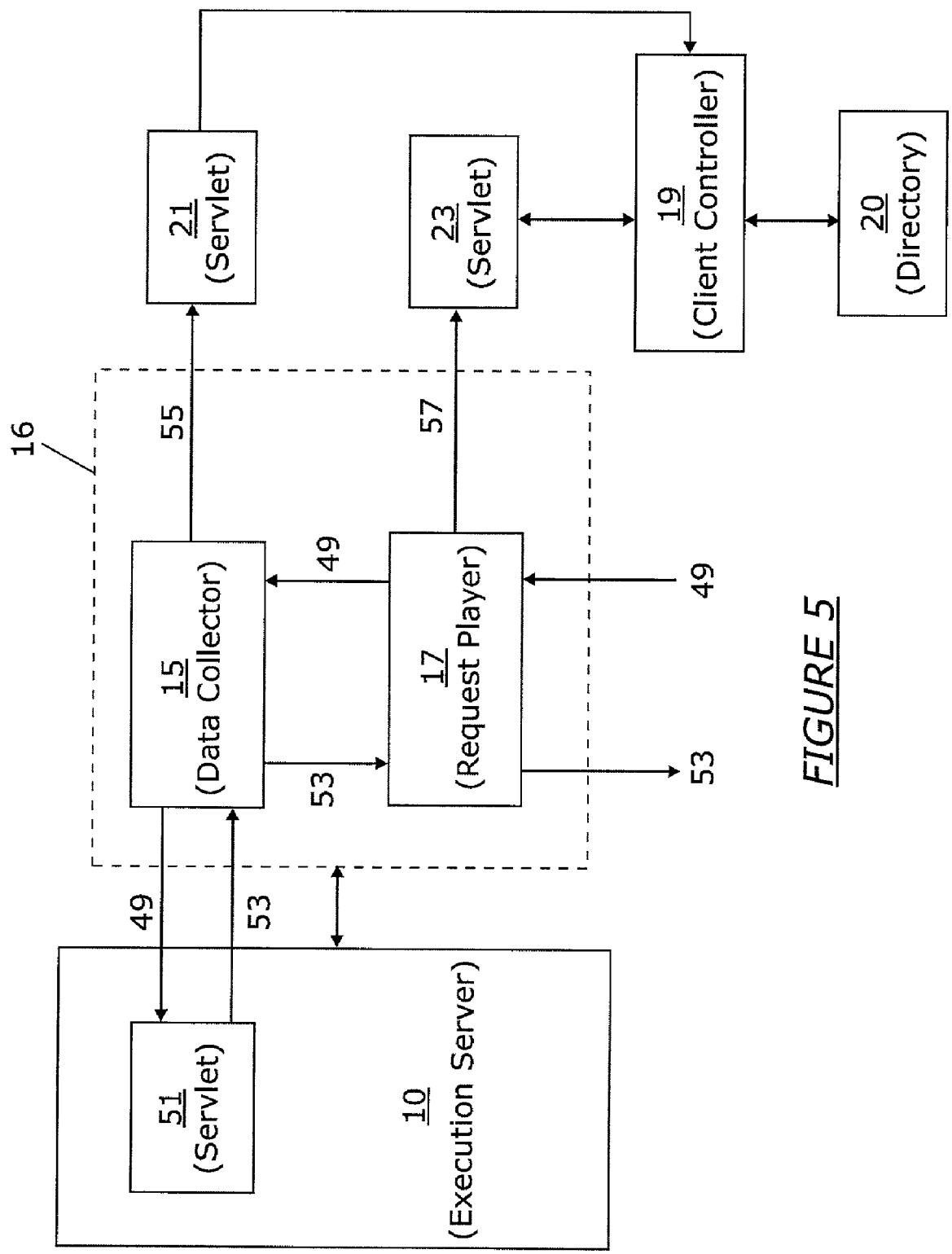
FIG. 5 illustrates how the HTTP transaction monitor interacts with a server hosting a web application.

FIG. 5 illustrates how the server-side component 16 (previously shown in FIG. 1) operates in accordance with one embodiment of the invention. Suppose that a request 49 is coming into the execution server 10. Before the execution server 10 processes the incoming request 49, the request player 17 intercepts the incoming request 49 and checks whether the incoming request 49 is a replay request. In one embodiment, this involves looking for a specific query string, e.g., "ffj_resend," in the URI of the incoming request. The query string appended to the URI may have the general form "ffj_resend=<id>&ffj$_{13}$ status={current,save,replay}." If the query string matches this format, then the request player sends a HTTP request 57 to servlet 23 to provide the original transaction record for that id and status (i.e., whether the transaction is a current, saved, or edited transaction). Servlet 23 uses the transaction id and status information to retrieve the (xml) file corresponding to the transaction record from the directory 20 and serves the file to the request player 17. Actually, the servlet 23 interacts with the client controller 19 which has access to the directory 20 and can retrieve files from the directory 20 using normal file operations. The request player 17 replaces the parameters and headers of the incoming request 49 with the data contained in the file received from the servlet 23. After modifying the incoming request 49, the request player 17 yields control to the data collector 15. If the incoming request 49 is not a replay request, the request player 17 immediately yields control to the data collector 15 without modifying the incoming request 49.

The data collector 15 intercepts the incoming request 49 and collects data about the request. The collected data includes information about the client making the request, the session state before the transaction, incoming cookies, properties of servlets and servlet engine running on the execution server 10, and all the request data except the exit status (see Table 1 above). After collecting data, the data collector 15 yields control to the execution server 10. The execution server 10 invokes a servlet 51 to process the request. The servlet 51 generates a response 53. After generating the response 53, the data collector 15 intercepts the response 53 and collects data about the response 53. The collected data includes information about the session state after the transaction, outgoing cookies, and the exit status of the response 53. The data collector 15 then notifies the client-side component (18 in FIG. 1) by sending a POST request 55 to the servlet (21 in FIG. 1). The POST request includes the recorded transaction data in xml format. The data collector 15 then yields control to the request player 17, which simply allows the response 53 to leave the execution server 10 without modification.

In one implementation, the request player 17 and data collector 15 rely on hooks on the execution server 10 to intercept incoming requests before and after the requests are processed. For the Tomcat web server, the "RequestInterceptor" API is used to intercept HTTP requests and responses, one for the data collection functionality and the other for the replay request functionality. The Tomcat web server is an open-source software project jointly run by Apache Software Foundation and Sun Microsystems Inc. The "RequestInterceptor" API provides hooks for invoking methods before and after the HTTP request is processed. The data collector 15 uses the "preService" method of one instance of the "RequestInterceptor" API to invoke methods which record data about the client, the session state before the transaction, the servlet properties data, incoming cookies, and all the request data except the exit status. The data collector 15 also uses the "postService" method of the same instance of the "RequestInterceptor" API to invoke methods which record outgoing cookies, session data after the transaction, and the exit status. The request player 17 uses the "preService" method of another instance of the "RequestInterceptor" API to intercept incoming requests, looking for query strings matching, for example, "ffj_resend." The invention is not limited to the Tomcat web server, but may be implemented on any web server having an in-process or out-of-process servlet engine (also called servlet runner or web container).

In another implementation, hooks in a server plug-in on the execution server 10 are used to intercept HTTP requests and responses. For example, the "Filter" API, as described in the version 2.3 of the Java™ Servlet specification, could be used for the same purpose as the "RequestInterceptor" API.

Operation

For the developer, the process of developing a web application involves, among other tasks, testing each dynamic web component (in the case of a Java™ application, each JSP™ and servlet) to see that it performs the correct processing and generates the appropriate output. This involves executing individual web components, and also sequences of components as they would be traversed by a user who browses the web site.

Referring to FIG. 4, it is assumed that the web application to be tested has been developed, for example, using an IDE such as IDE 6. It is further assumed that the developer is using the IDE 6 to test-run and debug the web application. The contents of the web application is displayed in a GUI 50 that is included in the IDE 6. The developer can select a resource, e.g., JSP™ page or servlet or other component, in the web application and ask the IDE 6 to execute the resource. For example, in FIG. 4, a JSP™ page called "input" has been selected. To display the page, the IDE 6 sends an HTTP request to the execution server (10 in FIG. 1). The output of the execution server (10 in FIG. 1), i.e., the HTTP response, is displayed in the browser 52 which is integrated into the IDE 6.

Referring to FIG. 1, the first thing that happens when the execution server 10 receives an HTTP request is that the request player 17 examines it to see if it is a replay request. If the request is a replay request, the request player requests for the transaction file from servlet 23 and modifies the request with the transaction data. If the request is not a replay request, the request player 17 does not modify the request. Instead, the request player 17 yields control to the data collector 15. The data collector 15 then intercepts the request and collects data about the request. After collecting the data, control is returned to the execution server 10, and the execution server 10 processes the request. If the functionality is implemented using hooks in a server plug-in (as opposed to the execution server itself), control is yielded to the server plug-in. The execution server 10 invokes a servlet (not shown) generated from the JSP™ page with the data that came in with the HTTP request. After processing, the execution server 10 sends the response page back to the browser (52 in FIG. 4). Before the response page is sent to the browser 52, the data collector 15 collects data on the response, and then yields control back to the execution server 10. After collecting data, the data collector 15 notifies the servlet 21 of the new transaction. The servlet 21 in turn notifies the GUI 22 (through the client controller 19) to update its transaction list. The GUI 22 interacts with the client controller 19 to get the updated transaction data from the directory 20.

Using the data collected by the data collector 15, the developer can examine through the GUI 22 the attributes of requests coming into the execution server 10 and attributes and data states of the processing servlet itself before and after the request is processed. If a problem arises, the developer can easily find the source of the problem by examining the transaction data between the browser (52 in FIG. 4) and the server 10. If a particular request for a resource is one that the developer wants to make regularly throughout the development phase, for instance, in order to verify that the web application continues to work as intended after changes have been made, then the corresponding HTTP transaction can be saved. This allows the developer to replay the transaction during future IDE sessions. The developer can also use the save functionality in case they wish to defer fixing a problem to a later date. The transaction or transactions corresponding to the requests that reproduce the problem can be saved, giving the developer the opportunity to examine and replay them during a future IDE session. The request player 17 thus saves the developer the trouble of repeatedly accessing the web application resources through a web browser (as a user of the web application would), including reducing the need to fill in HTML forms to generate requests. Because the data collector 15 records data both for regular and replayed requests, it is easy to compare the results from one test-run to another.

The server-side component 16 intercepts all requests sent to the execution server 10, not just requests that are initiated from the IDE 6. This means that if the machine on which the execution server 10 is running is networked, then the server-side component 16 could process HTTP requests from clients on other machines. This feature can be useful in the testing phase. Suppose that a test engineer has identified a way of entering data into a web application that causes a problem for one of the dynamic components. Then the web developer could start up the execution server 10 with the server-side component 16. The test engineer can then, on his or her own machine, point a web browser to the host and port of the execution server 10 to access the web application and enter the data that reproduces the problem. The web developer can then use the client-side component 18 to examine what happened with the request and replay it as needed from the developer's own computer.

All HTTP requests that the sever-side component 16 intercepts, whether they originated from the IDE 6, from the client-side component 18 (as a replay request), or from another client, are available to the web developer to replay. With reference to the scenario described in the previous paragraph, suppose that the test engineer accessed two resources in the web application, one for a form and one for submitting the data from the form, resulting in two HTTP transactions on the "Current Transactions" lists. It is the second transaction, i.e., the one for submitting the data from the form, that will be associated with the bug. The web developer could first replay the second transaction to find out what is going wrong. Then the web developer could make changes to the web application with the aim to fix the problem. After making the changes, the web developer can then replay the same transaction again, this time to confirm that the bug has been fixed. Replaying the transaction saves the web developer from repeatedly loading the form corresponding to the first request and manually entering the data.

Except for the simplest web applications, there will be dynamic resources that are such that they cannot be invoked in isolation. These resources are such that their execution involves processing some condition, and certain output pages are only generated if the conditions are met. The conditions are typically met by executing other resources in such as way that some type of data becomes available to the resource. The background section listed the dynamic resources that generate pages that are part of a checkout process as an example of this behavior. In this case, the dynamic resource that generates the first form of the checkout process would typically generate a page with an information message instead if the user's virtual shopping cart is empty and so on.

Suppose that the developer is aware of a bug that manifests itself part way into the checkout process. In order to reproduce the problem the first time, the developer has to enter data through actual generated web pages. After attempting to fix the problem, the user will then need to verify the fix by reproducing the same HTTP requests again (and again if the first attempt fails). Repeating the process of entering data through the web site is often very time consuming. Using the tool the developer can use the replay feature to manually repeat individual HTTP requests, which saves some time but which can still be inefficient if number of steps to reach the desired state is high. Using the invention described in this application, however, the developer can set up the whole sequence to be replayed.

There are two ways of setting up the sequence. If the transactions corresponding to the requests have already been recorded, the developer can select "Create new sequence" from the "Transaction Sequences" folder and then select the relevant transactions and use the "Copy request into sequence" action. Alternatively, the developer can create a sequence folder prior to attempting to reproduce the problem and configure the tool to record requests into the sequence. The developer then accesses the web application as a user and enters the data needed to reproduce the problem. Then the recording feature of the sequence is turned off. Now the developer can start working on the problem, and whenever the developer wishes to see if the fix works, the developer can replay the sequence. Thus, the invention benefits the developer (or user) by removing the need to repeatedly move through a sequence of pages to reproduce a problem and verify attempts to fix the problem.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for monitoring data flow in a web application hosted on a server, comprising:
    obtaining a list of HTTP requests processed on the server while interacting with the web application;
    selecting a number of HTTP requests from the list to re-process on the server;
    sending a request to the server to re-process the selected number of HTTP requests;
    collecting data passed between components of the web application before and after each HTTP request is processed; and
    wherein the request comprises a predetermined sequence in which the selected number of HTTP requests are to be re-processed and wherein the predetermined sequence corresponds to the order in which the selected number of HTTP requests were originally processed by the server.

2. The method of claim 1, wherein sending the request to the server comprises sending the selected number of HTTP requests to the server according to a predetermined sequence.

3. The method of claim 2, wherein each of the selected number of HTTP requests has a timeout period within which it should be completely processed by the server.

4. The method of claim 3, further comprising displaying a notification if the timeout period is exceeded before the HTTP request is completely processed by the server.

5. The method of claim 3, further comprising displaying an output of the server after processing each HTTP request.

6. The method of claim 3, further comprising displaying an output of the server after processing the last HTTP request in the predetermined sequence.

7. The method of claim 2, further comprising editing data associated with a selected one of the selected number of HTTP requests.

8. The method of claim 7, further comprising reconstructing the selected one of the selected number of HTTP requests with the edited data prior to the server re-processing the selected one of the selected number of HTTP requests.

9. The method of claim 1, wherein the collected data comprises one selected from the group consisting of data contained in the HTTP request, data contained in an HTTP response generated after processing the HTTP request, properties of dynamic component invoked by the server to process the HTTP request, data contained in a cookie associated with the HTTP request, data contained in a cookie associated with the HTTP response, and combinations thereof.

10. A method for monitoring data flow in a web application hosted on a server, comprising:
    saving HTTP transactions executed on the server while interacting with the web application;
    selecting a number of the saved HTTP transactions to re-process on the server;
    sending a request to the server to re-process the selected number of the saved HTTP transactions;
    collecting data passed between components of the web application before and after each HTTP transaction is executed; and
    wherein the request comprises a predetermined sequence in which the selected number of HTTP requests are to be re-processed and wherein the predetermined sequence corresponds to the order in which the selected number of HTTP requests were originally processed by the server.

11. The method of claim 10, wherein the saved HTTP transactions each comprise an HTTP request, and sending the request to the server comprises sending the HTTP requests for the selected number of the saved HTTP transactions to the server according to a predetermined sequence.

12. The method of claim 11, wherein each HTTP request has a timeout period within which it should be completely processed by the server.

13. The method of claim 12, further comprising displaying a notification if the timeout period is exceeded before the HTTP request is completely processed.

14. The method of claim 11, further comprising displaying an output of the server executing each HTTP transaction in the predetermined sequence.

15. The method of claim 11, further comprising displaying an output of the server after executing the last HTTP transaction in the predetermined sequence.

16. The method of claim 10, wherein the collected data comprises one selected from the group consisting of data contained in an HTTP request associated with each HTTP transaction, data contained in an HTTP response generated after processing of the HTTP request, properties of dynamic component invoked by the server to process the HTTP request, data contained in a cookie associated with the HTTP request, data contained in a cookie associated with the HTTP response, and combinations thereof.

17. A mechanism for monitoring data flow in a web application hosted on a server, comprising:
    a directory for storing HTTP transactions executed on the server while interacting with the web application;
    a display through which a request can be sent to the server to re-process a selected number of the HTTP transactions in the directory;
    a data collector which selectively intercepts the HTTP transactions executed on the server in order to collect data passed between components of the web application; and wherein the request comprises a predetermined sequence in which the selected number of HTTP requests are to be re-processed and wherein the predetermined sequence corresponds to the order in which the selected number of HTTP requests were originally processed by the server.

18. The mechanism of claim 17, further comprising an editor through which data associated with the selected number of the HTTP transactions can be edited prior to sending the request to the server.

19. The mechanism of claim 18, further comprising a request player which reconstructs the request using the edited data prior to the server processing the request.

20. The mechanism of claim 19, wherein the request comprises individual HTTP requests, each of which corresponds to one of the selected number of HTTP transactions.

21. The mechanism of claim 17, further comprising means for storing the data collected by the data collector in the directory.

22. The mechanism of claim 17, further comprising means for notifying the display of data collected by the data collector.

23. A system for testing and debugging a web application, comprising:
- a server hosting the web application;
- a directory for storing HTTP transactions executed on the server while interacting with the web application;
- a client through which a request can be sent to the server to re-process a selected number of the HTTP transactions in the directory;
- a data collector running on the server which selectively intercepts HTTP transactions executed on the server in order to collect data passed between components of the web application; and and wherein the request comprises a predetermined sequence in which the selected number of HTTP requests are to be re-processed and wherein the predetermined sequence corresponds to the order in which the selected number of HTTP requests were originally processed by the server.

24. The system of claim 23, further comprising an application which starts the server in a separate process and through which the client can be started.

25. The system of claim 24, where the application is an integrated development environment.

26. The system of claim 25, wherein the application includes an HTTP server.

27. The system of claim 26, wherein the HTTP server includes a mechanism for receiving data from the data collector and notifying the client of the collected data.

28. The system of claim 23, further comprising a request player which reconstructs the request using data associated with the HTTP transactions prior to the server processing the request.

29. The system of claim 28, further comprising an editor through which data associated with the selected number of the HTTP transactions can be edited prior to sending the request to the server.

30. The system of claim 29, wherein the client includes an action for invoking the editor.

31. The system of claim 23, wherein the client includes a controller which manages access to the directory.

* * * * *

UNITED STATES PATENT AND TRADEMARK OFFICE
CERTIFICATE OF CORRECTION

PATENT NO.       : 7,099,939 B2                                      Page 1 of 1
APPLICATION NO.  : 09/874893
DATED            : August 29, 2006
INVENTOR(S)      : von Klopp et al.

It is certified that error appears in the above-identified patent and that said Letters Patent is hereby corrected as shown below:

On the Title page,

[*] Notice:    Subject to any disclaimer, the term of this patent is extended or adjusted under 35 USC 154(b) by (874) days Delete the phrase "by 874" and insert -- by 973 days--

Signed and Sealed this

Twenty-seventh Day of March, 2007

JON W. DUDAS
*Director of the United States Patent and Trademark Office*